United States Patent
Tavallaei et al.

[11] Patent Number: 6,141,708
[45] Date of Patent: Oct. 31, 2000

[54] HOST BRIDGE CONFIGURED TO MASK A PORTION OF PERIPHERAL DEVICES COUPLED TO A BUS FURTHER DOWNSTREAM OF THE HOST BRIDGE FROM A HOST PROCESSOR

[75] Inventors: Siamak Tavallaei, Spring; Brian T. Purcell, Tomball; Brian S. Hausauer, Spring, all of Tex.

[73] Assignee: Compaq Computer Corporation, Houston, Tex.

[21] Appl. No.: 09/098,015

[22] Filed: Jun. 15, 1998

[51] Int. Cl.[7] ................................... G06F 13/14
[52] U.S. Cl. .................. 710/62; 710/100; 710/107; 710/128; 710/130
[58] Field of Search ................. 710/62, 100, 107, 710/128, 130

[56] References Cited

U.S. PATENT DOCUMENTS

5,734,847  3/1998  Garbus et al. .......................... 710/128
5,838,935  11/1998  Davis et al. ............................ 710/129
5,848,249  12/1998  Garbus et al. ......................... 710/128

Primary Examiner—Thomas C. Lee
Assistant Examiner—Abdelmoniem Elamin
Attorney, Agent, or Firm—Fletcher, Yoder & Van Someren

[57] ABSTRACT

A computer system with an Intelligent Input/Output architecture having a scheme for hiding at least a portion of peripheral devices. The computer system comprises at least one host processor for executing a host operating system, the host processor disposed on a host bus, a first input/output (I/O) bus operably coupled to the host bus via a host-to-bus bridge, and a plurality of peripheral devices operably connected to the I/O bus for transferring data in I/O transactions. A masking module is provided for rendering at least a portion of the plurality of peripheral devices hidden from the host operating system and host processors. The masking module is configured upon system initialization and the contents of the module are used in blocking IDSEL signals associated with the portion of peripheral devices subordinated to an I/O processor.

18 Claims, 8 Drawing Sheets

Bit Description for PCI Device ID Mask Register

| Bit Field high low | PwrOn State | POST State | ACC | Description |
|---|---|---|---|---|
| 15  0 | 0000h | xxxxh | R/W | 16 bit mask that corresponds one-to-one with devices 0-15 of PCI bus.<br><br>For each bit:<br>0 = When Host-to-Bus Bridge runs a config cycle with this device number, it should not mask IDSEL from asserting.<br>1 = When Host-to-Bus Bridge runs a config cycle with this device number, it should mask IDSEL from asserting. The config cycle will master abort on the PCI bus.<br><br>Bit 00 = PCI device 00    Bit 08 = PCI device 08<br>Bit 01 = PCI device 01    Bit 09 = PCI device 09<br>Bit 02 = PCI device 02    Bit 10 = PCI device 10<br>Bit 03 = PCI device 03    Bit 11 = PCI device 11<br>Bit 04 = PCI device 04    Bit 12 = PCI device 12<br>Bit 05 = PCI device 05    Bit 13 = PCI device 13<br>Bit 06 = PCI device 06    Bit 14 = PCI device 14<br>Bit 07 = PCI device 07    Bit 15 = PCI device 15 |

HOST BRIDGE CONFIGURED TO MASK A PORTION OF PERIPHERAL DEVICES COUPLED TO A BUS FURTHER DOWNSTREAM OF THE HOST BRIDGE FROM A HOST PROCESSOR

BACKGROUND OF THE INVENTION

1. Field of the Invention

The present invention relates to computer systems with novel input-output (I/O) architectures, and more particularly, and not by way of limitation, to systems for hiding peripheral devices connected to a bus from the host operating system and associated host processor.

2. Description of Related Art

A conventional computer system typically includes one or more central processing units (CPUs) capable of executing algorithms and one or more memory subsystems. Computer systems also include peripheral devices, or, peripherals, for inputting and outputting data. Some common peripheral devices include, for example, monitors, keyboards, printers, modems, hard disk drives, floppy disk drives, and network controllers. As known in the art, peripheral devices may be conveniently categorized into several classes based on their functionality. For example, the "block storage device" class of peripherals may include hard disk drives, whereas the "Local Area Network (LAN) ports" class may include LAN controllers, such as, for example, Ethernet controllers. The various components of a computer system communicate and transfer data using a bus system which is connected to the communicating components.

One of the key factors in the performance of a computer system is the speed at which the CPU operates. Generally, the faster the CPU operates, the faster the computer system can complete a designated task. Another method of increasing the speed of a computer system is using multiple CPUs, commonly known as multi-processing. With multiple CPUs, algorithms required to complete a task can be executed substantially in parallel as opposed to their sequential execution.

However, the addition of a faster CPU or additional CPUs can result in different increases in performance among different computer systems. Although it is the CPU that executes the algorithms required for performing a designated task, in many cases, it is the peripherals that are responsible for providing data to the CPU and storing or outputting the processed data from the CPU. When a CPU in operation attempts to read or write to a peripheral, the CPU often "sets aside" the algorithm which it is currently executing and is diverted to executing the read/write transaction (also referred to as an Input/Output transaction, or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith would create a bottleneck in the overall performance of the computer system. As the CPU becomes faster, the amount of time executing algorithms becomes less of a limiting factor compared to the time expended in performing an I/O transaction. Accordingly, the improvement in the performance of the computer system that could theoretically result from the use of a faster CPU or the addition of another CPU may become substantially curtailed by the bottleneck created by I/O transactions. Moreover, it can be readily appreciated that any performance degradation due to such I/O bottlenecks in a single computer system may have a stifling effect on the overall performance of a computer network in which the computer system is disposed.

Operating peripheral devices in association with a computer system typically requires a piece of executable code, known commonly as a device driver. Because peripherals are often manufactured separately from the CPU, the operation of a peripheral is generally effectuated by a unique device driver associated with the specific peripheral. The device driver, which controls the peripheral, is an executable computer program that is executed by the CPU and must be compatible with the particular operating system (OS) of the computer system. It can be readily seen that because device drivers are unique to both operating systems as well as peripherals, a considerable number of device drivers are typically required to support the numerous possible combinations of peripherals and operating systems. Accordingly, it can be appreciated that the ensuing device driver proliferation thwarts the objective of device driver portability in the design of cross-platform computer system architectures.

Based on the foregoing discussion, it should be appreciated that current computer systems with a conventional I/O architecture utilizing device drivers described above suffer from a lack of device driver portability and performance constraints due to I/O bottlenecks. In order to address these shortcomings, an alternative I/O architecture—commonly known as the Intelligent Input/Output ($I_2O$) architecture—has been developed in the computer industry. Because the teachings of the present invention may be better described in relation to the $I_2O$ architecture, a brief description thereof is provided hereinbelow.

The $I_2O$ architecture uses a "split driver" model which inserts a messaging layer between the portion of the device driver specific to the operating system and the portion of the device driver specific to the peripheral. The messaging layer splits the single device driver of today into two separate modules—an Operating System Service Module (OSM) and a Downloadable Driver Module (DDM). The only interaction one module has with another module is through this messaging layer which provides the communication means.

The OSM comprises the portion of the device driver that is specific to the operating system. The OSM interfaces with the operating system of the computer system (which may also be referred to in the art as the "host operating system") and is executed by the host CPU or processor. Typically, single OSM may be used to service a specific class of peripherals. For example, one OSM would be used to service all block storage devices, such as hard disk drives and CD-ROM drives.

The DDM provides the peripheral-specific portion of the device driver that understands how to interface to the particular peripheral hardware. To execute the DDM, an $I_2O$ Input/Output Processor (IOP) is added to the computer system. A single IOP may be associated with multiple peripherals, each controlled by a particular DDM, and contains its own operating system such as, for example, the I₂O Real-Time Operating System (iRTOS). The DDM directly controls the peripheral, and is executed by the IOP under the management of the iRTOS.

Those skilled in the art will recognize that a DDM may typically comprise a Hardware Device Module (HDM) that directly interfaces with the peripheral and is responsible for its control and data transfer associated therewith. DDMs can also comprise an Intermediate Service Module (ISM) which is an additional software interface to the HDM. The ISM is often used for filtering, encoding, and decoding messages to the HDM.

In general operation, the communication model used in the I₂O architecture is a message passing system. When the CPU seeks to read or write to a peripheral in an I₂O system, the host operating system makes what is known as a "request". The OSM translates the request by the host operating system and, in turn, generates a message. The OSM sends the message across the messaging layer to the DDM associated with the peripheral which processes it appropriately to achieve a result. Upon completion of the processing, the DDM sends the result back to the OSM by sending an appropriate message through the messaging layer. It can be appreciated that to the host operating system, the OSM appears just like any other device driver.

By executing the DDM on the IOP, the time-consuming portion of transferring information from and to the peripheral hardware is off-loaded from the CPU to the IOP. With this off-loading, the CPU is no longer diverted for inordinate amounts of time during an I/O transaction. Moreover, because the IOP is a hardware component essentially dedicated to the processing of the I/O transactions, the problem of I/O bottlenecks is mitigated.

The I₂O architecture also significantly reduces the number of device drivers written on the basis of the split driver model. Typically, peripheral device manufacturers need only write a single DDM for a particular peripheral which can now operate with any host operating system. The vendors of the host operating system need only write one OSM for each class of peripherals, e.g., the network controller class.

One of the goals of the I₂O architecture is to allow standard "non-intelligent" or "semi-intelligent" peripheral devices to be controlled by a generic I₂O IOP resource that could be added to a computing system. If the IOP contains the necessary software to control a particular peripheral device, the device may be abstracted through the IOP to "look" like an intelligent 120 peripheral. However, it may be appreciated that in order to incorporate the I₂O technology in a computer system and realize the benefits afforded thereby, host processors and operating systems need to be able to differentiate between peripheral devices that are under the control of an IOP (that is, peripherals subordinate to the IOP) and peripheral devices that are not (that is, "system" or "public" peripherals under the control of the host processor/s). Although system software that is I₂O-compliant is typically capable of making this distinction, legacy software, i.e., software developed and deployed prior to the development of the I₂O architecture or which is otherwise not I₂O-compliant, on the other hand, usually cannot make this distinction. Therefore, to retain the investment made in the legacy software through its continued use while at the same time realizing the benefits of the I₂O technology, there has arisen a substantial need for schemes whereby subordinate peripheral devices are rendered "invisible" or "hidden" from host processors and operating systems.

One of the current methods used for hiding peripheral devices involves the use of an IOP having bus-to-bus bridge functionality. Typically, the bridge functionality of the device is used for coupling two buses, such as the Peripheral Component Interconnect (PCI) buses. The up-stream bus may be referred to as a primary bus, whereas, the down-stream bus may be referred to as a secondary bus. The IOP (for example, the i960® processor), provided for controlling the peripherals on the secondary bus, uses its private address space allocation mechanism for hiding such devices. Accordingly, devices under the control of the IOP are hidden from the host processors and their related software by placing these devices behind the PCI-to-PCI bridge and allocating memory address space to the down-stream PCI bus for address information pertaining to them. The allocated memory address space is inaccessible by the host processors and, thus, the peripheral devices are rendered invisible thereto.

Another known method of hiding peripheral devices involves the use of certain switching devices (for example, components known in the industry as QuickSwitch® devices) for blocking a PCI signal line that is used as "chip select" signal for the peripheral devices during their configuration. When a host processor runs configuration cycles to these devices, because of the blocking of the appropriate PCI signal line, they will not be enumerated.

Current solutions, such as those described hereinabove, for hiding peripheral devices from host processors have various deficiencies and shortcomings. For example, one approach requires the use of a particular type of IOP (having a PCI-to-PCI bridge) with its private address space allocation mechanism. Also, in this approach, it is required that the devices be placed down-stream from the PCI—PCI bridge for hiding them. The "quick switch" approach, on the other hand, entails the use of additional components, thereby adding to the cost and complexity of the computer system.

SUMMARY OF THE INVENTION

The present invention overcomes the above-identified problems as well as other shortcomings and deficiencies of the existing technology by providing a masking apparatus for hiding peripheral devices at a location in the computer system that is as geographically close as possible to the host processor bus. In one embodiment, the masking apparatus may be provided with (or, it could reside in) one of the host processors of the computer system itself. Accordingly, any peripheral device that is down-stream may be rendered maskable during its configuration, even where it is placed in front of a PCI-to-PCI bridge.

The present invention is drawn to a computer system with an Intelligent Input/Output architecture having a scheme for hiding at least a portion of peripheral devices. The computer system comprises at least one host processor for executing a host operating system, the host processor disposed on a host bus, a first input/output (I/O) bus operably coupled to the host bus via a host-to-bus bridge, and a plurality of peripheral devices operably connected to the I/O bus for transferring data in I/O transactions. A masking module is disposed on the I/O bus for rendering at least a portion of the plurality of peripheral devices hidden from the host operating system and host processors. The masking module is configured upon system initialization and the contents of the module are used in blocking IDSEL signals associated with the portion of peripheral devices subordinated to an I/O processor.

Additionally, the present invention is directed to a method of hiding at least a portion of peripheral devices disposed on an input/output (I/O) bus from a host processor and its software in a computer system that includes a host-to-bus bridge for coupling between the I/O bus and a host bus, and an I/O processor. The method comprises the following steps: discovering the I/O processor during a configuration cycle; initializing the I/O processor; scanning the I/O bus for the peripheral devices; determining if any of the peripheral devices is subordinate to the I/O processor; and programming a mask register based at least in part on determination. In yet another aspect of the methodology of the present invention, the mask register may be programmed to block any combination of the memory, I/O or configuration cycles associated with the peripheral devices that need to be rendered hidden.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

The innovative teachings of the present application will be described with particular reference to numerous exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
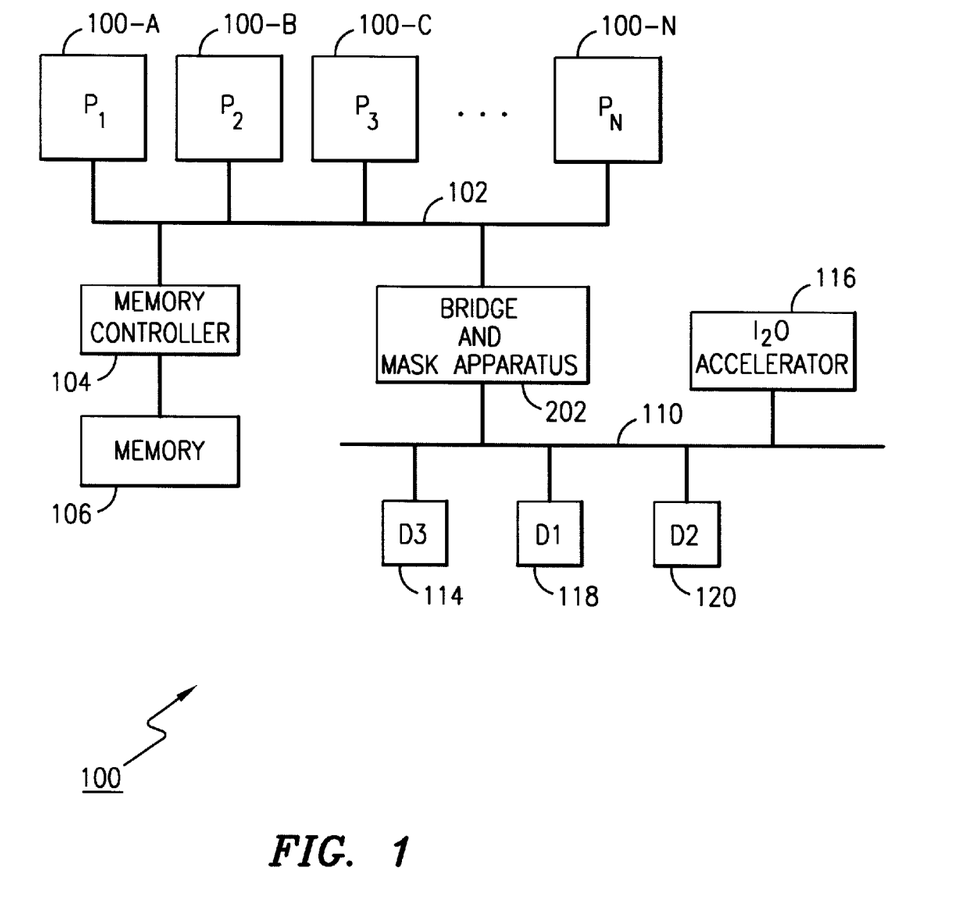
FIG. 1 is a block diagram of an exemplary embodiment of a computer system provided in accordance with the teachings of the present invention.

Referring now to the drawings wherein like or similar elements are designated with identical reference numerals throughout the several views, and wherein the various elements depicted are not necessarily drawn to scale, and, in particular to FIG. 1, a block diagram of an exemplary embodiment of a computer system 100 is depicted therein in accordance with the teachings of the present invention. The computer system 100 comprises one or more host processors or CPUS, for example, processors labeled as $P_1$ through $P_N$, with reference numerals 100-A through 100-N, respectively. A host bus 102 is interconnected among the processors 100-A through 100-N for providing a communication pathway. A memory controller 104 is disposed on the host bus 102 for controlling accesses to and from a memory 106. A bridge and mask apparatus module 202, provided in accordance with the teachings of the present invention, is connected to the host bus 102. The bridge and mask apparatus module 202 provides a communication pathway between the host bus 102 and an input/output (I/O) bus 110 to which various peripheral devices may be attached. For example, the bus 110 may comprise a PCI bus providing a communication path among the PCI-compliant peripheral devices.

An $I_2O$ accelerator 116 comprising an Input/Output Processor and associated circuitry is connected to the I/O bus 110. The $I_2O$ accelerator 116 is provided for harnessing the benefits of the $I_2O$ technology by controlling accesses to one or more subordinate peripheral devices, for example, devices D1 and D2, with reference numerals 118 and 120, respectively. In addition, one or more peripheral devices, for example, device D3 with reference numeral 114, may also be coupled to the I/O bus 110.

The bridge and mask module 202 may be configured at the power up of the computer system 200 in accordance with the teachings of the present invention such that devices 118 and 120 may be rendered hidden or invisible to the host processors 100-A through 100-N and associated host operating system. The detailed description of the methodology of system configuration for hiding peripheral devices will be provided in particular reference to the flow chart illustrated in FIG. 6 hereinbelow. It should be appreciated by one of ordinary skill in the art that although not shown in this exemplary embodiment, it is contemplated herein that a separate bus-to-bus bridge may also be provided with additional devices behind it on a secondary I/O bus. In such a situation, the bridge and mask module 202 may be also configured to hide the entire subsystem comprising the bus-to-bus bridge and the devices on the secondary bus.

Figure 2:
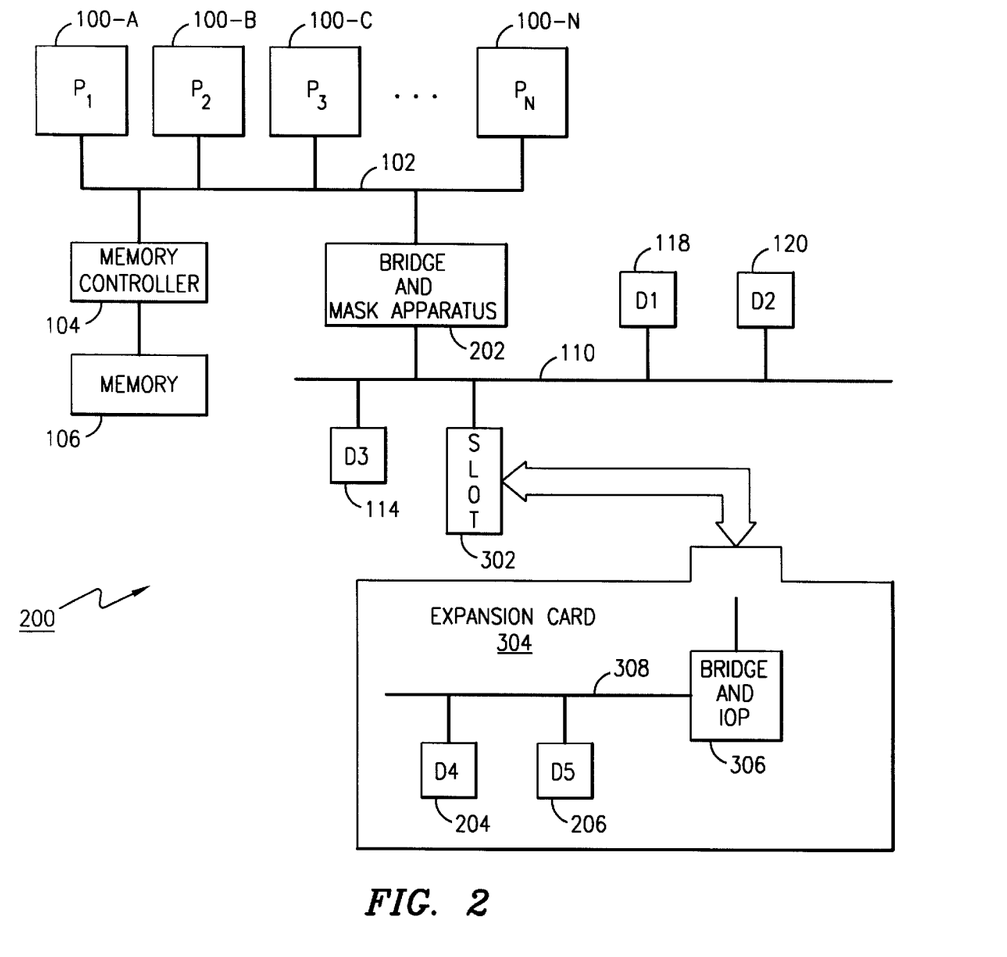
FIG. 2 is a block diagram of another exemplary embodiment of a computer system provided in accordance with the teachings of the present invention.
Figure 3:
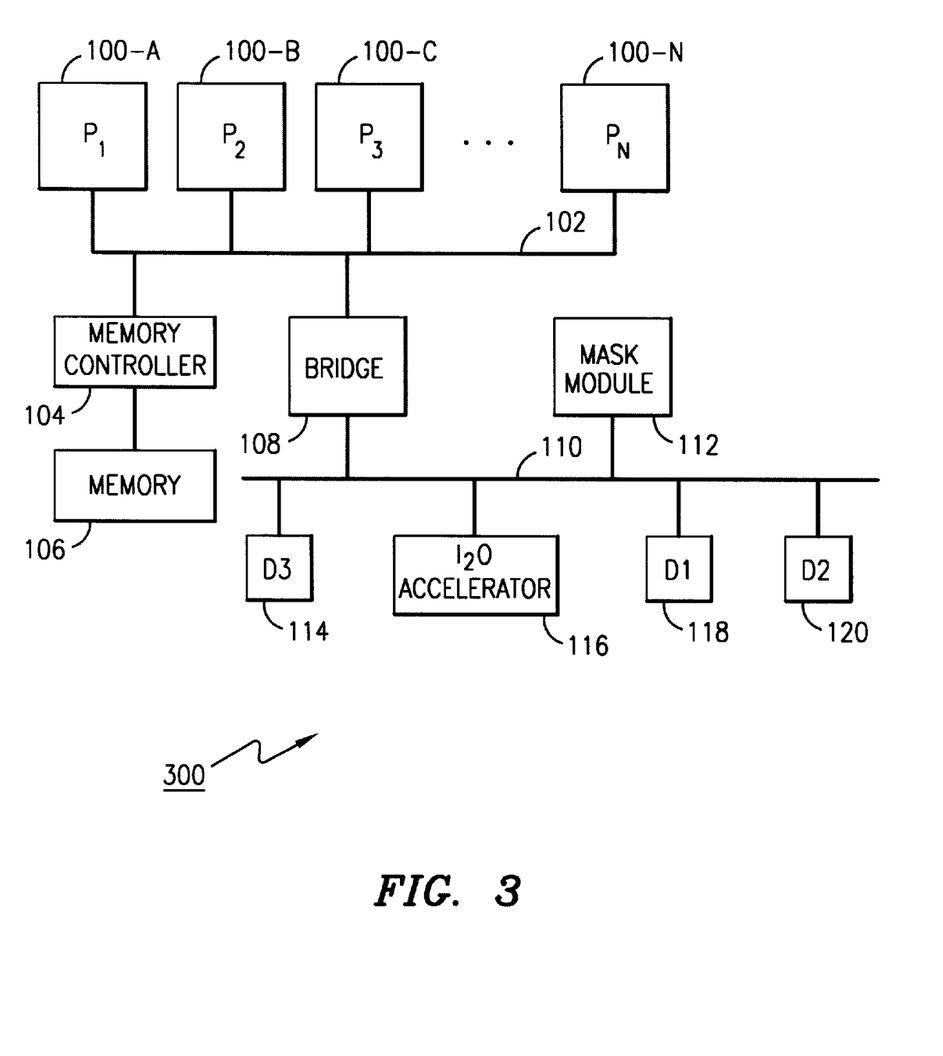
FIG. 3 is a block diagram of yet another exemplary embodiment of a computer system provided in accordance with the teachings of the present invention.

Referring now to FIGS. 2 and 3, block diagrams of other exemplary embodiments of computer system 200 and computer system 300, respectively, are shown in accordance with the teachings of the present invention. It can be seen that the computer systems 200 and 300 are similar to the computer system 100 described above. Accordingly, only salient distinguishing aspects of these exemplary embodiments will be described here.

In particular reference to FIG. 2, an expansion slot 302 is disposed on the bus 110 for facilitating cooperative coupling with an expansion card 304. A private bus 308 is provided on the expansion card 304 for interconnecting additional subordinate peripheral devices 204 and 206 with a bridge 306 having an IOP and associated circuitry (not shown). As will be described later in more detail, the bridge and mask apparatus module 202 of the computer system 200 can be configured upon system initialization so that the devices 118 and 120 are hidden from the host processors and operating systems.

In FIG. 3, the computer system 300 comprises a separate bridge 108 and mask module 112. The mask module 112 can be configured upon system initialization in accordance with the teachings of the present invention so that the subordinate devices 118 and 120 are rendered hidden.

Figure 4:
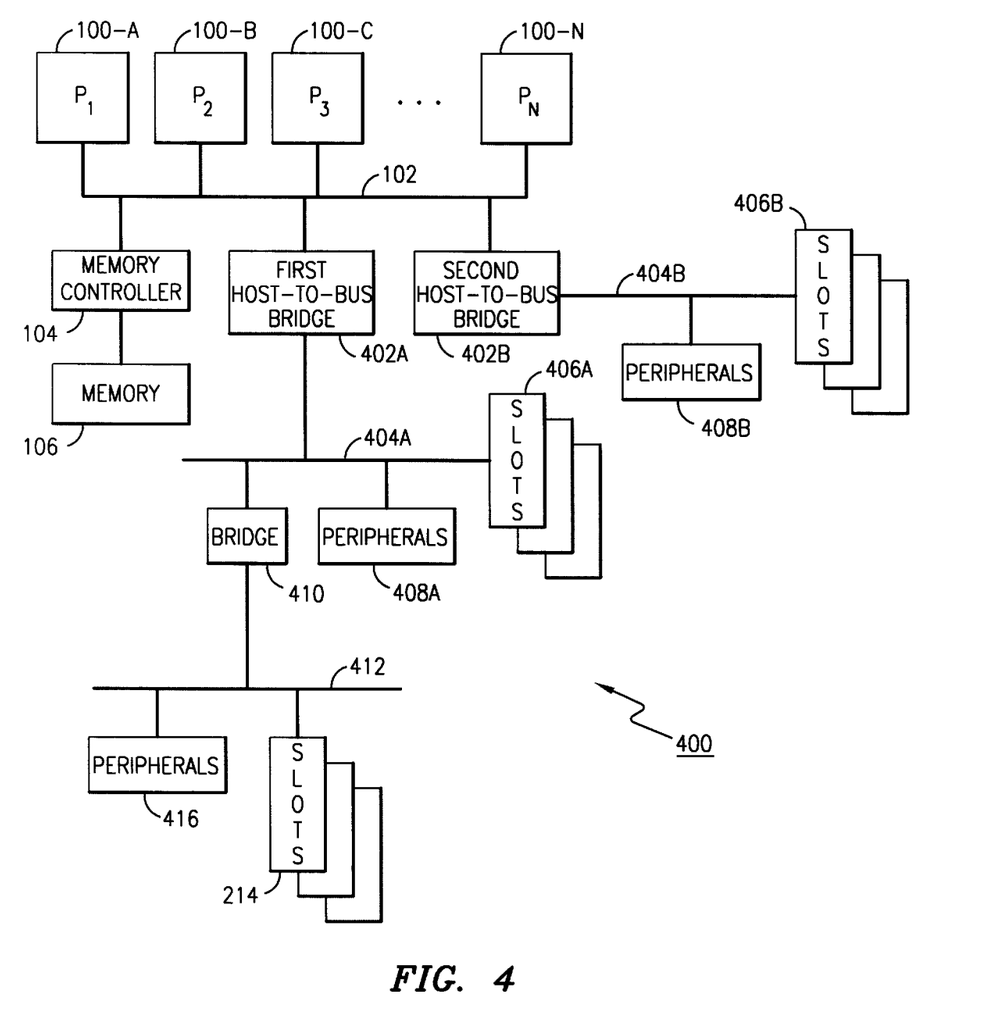
FIG. 4 is a block diagram of a still further exemplary embodiment of a computer system provided in accordance with the teachings of the present invention.

Referring now FIG. 4, a still further exemplary embodiment of a computer system 400 is shown in a block diagram. A first host-to-bus bridge 402A and a second host-to-bus bridge 402B are disposed on the host bus 102 for providing communication pathways to two separate buses, bus 404A and bus 404B, respectively. One or more peripheral devices 408B are coupled to the bus 404B. In addition, one or more expansion slots 406B are provided in connection with the bus 404B for adding various expansion cards (not shown). Similarly, one or more peripheral devices 408A and one or more expansion slots 406A also provided in connection with the bus 404A. A bus-to-bus bridge 410 is coupled between the bus 404A and an expansion bus 412 for providing a communication pathway therebetween. One or more peripheral devices 416, compatible with the expansion bus 412 and one or more compatible expansion slots 414 are also provided in connection with the expansion bus 412. Those skilled in the art can recognize that the buses 404A and 404B may typically comprise suitable PCI buses, whereas, the expansion bus 412 may be exemplified by an Extended Industry Standard Architecture (EISA) bus.

Still referring to FIG. 4, in a presently preferred exemplary embodiment of the present invention, the first host-to-bus bridge 402A is referred to as the compatibility bridge because it connects legacy buses and peripheral devices to the rest of the computer system 400. Examples of legacy buses and peripheral devices typically include: EISA and ISA buses, certain interrupt controllers, timers, hard disk controllers, et cetera. The second host-to-bus bridge 402B typically connects only to non-legacy devices, except certain video graphics devices. A masking register (not shown) may be implemented in at least one of the bridges, for example, host-to-bus bridge 402B, in accordance with the teachings of the is present invention for the purpose of supporting an I$_2$O accelerator (not shown in this FIGURE) and hiding a portion of peripheral devices from the host processors 100-A through 100-N and the operating system therefor. As has been described above with respect to other exemplary embodiments, however, it should be understood that such means for masking may also be implemented as a separate device.

In accordance with the teachings of the present invention, a mask register (denoted hereinafter as PCI_Device_ID_Mask) is preferably provided with a host-to-bus bridge (e.g., the host-to-bus 402B in this FIGURE) in its configuration space. In a preferred exemplary embodiment, the PCI_Device_ID_Mask register comprises at least 16 bits, wherein each bit represents a mask bit to block a PCI signal line called IDSEL (the Initialization Device Select signal). As is known in the art, the IDSEL signal is used as a "chip select" signal for Type 0 configuration cycles relating to PCI-compliant peripheral devices disposed on the same I/O bus as the initiator (for example, the primary-side bus). Additional logic circuitry may be provided involving Type 1 configuration cycles (used to forward configuration cycles across a bus bridge, which cycles are converted to Type 0 cycles on the secondary bus) when secondary-side devices are to be hidden from the host processors and associated operating system.

As is known in the art, PCI-compliant devices typically implement a configuration address space used for device configuration, initialization and error handling. A bus transaction known as a configuration cycle is performed for device initialization and configuration via the configuration address space. The configuration cycle may involve a configuration access which comprises at least a configuration read, a configuration write or both. During a Type 0 configuration access, a PCI-compliant device (also sometimes referred to as an agent) is selected when its IDSEL signal is asserted in addition to other appropriate signal conditions on relevant address/data (AD) lines (that is, for example, the AD[1::0] lines are set "00"). While the agents typically decode their addresses for normal accesses, accesses in the configuration address space require device selection decoding to be done externally and to be signaled to the appropriate agent via its IDSEL pin.

It can be appreciated that Type 0 configuration accesses are not propagated beyond the local PCI bus and must be claimed by a local peripheral device. Otherwise, such accesses are terminated with a Master-Abort condition. If the target of a configuration access resides on another bus (for example, the secondary bus), a Type 1 configuration access must be used. Type 1 accesses are ignored by all target devices except bus-to-bus bridges. These devices decode a parameter known as Bus Number Field to determine if the destination of the configuration access is residing behind the bridge. If the Bus Number is not the secondary bus of the bridge, the access is simply passed through unchanged. On the other hand, if the Bus Number matches the secondary bus number, the bridge converts the access into a Type 0 configuration access. The bridge changes AD[1::0] to "00" and passes a select number of AD lines (AD[10::2]) through unchanged. The Device Number is then decoded to select one of the 32 devices on the appropriate local bus. Subsequently, the bridge asserts the correct IDSEL and initiates a configuration access.

The host-to-bus bridge of the present invention, such as bridge 402B (shown in FIG. 4) and exemplified by the embodiment 500, is provided with the capability to run PCI configuration cycles on behalf of the host processors. Further, the bridge 402B can generate an external IDSEL signal on one of the lines AD[31::16] for a particular PCI-compliant device, which device has a device ID from 0 to 15. As can be appreciated by those skilled in the art upon reference hereto, the external IDSEL signal for a PCI-complaint peripheral device can be masked by utilizing an appropriate bit location of the PCI_Device_ID_Mask register provided in the configuration space of the bridge 402B. In accordance with the teachings of the present invention, the PCI_Device_ID_Mask register can be suitably programmed upon system initialization and configuration setup such that bits corresponding to a select portion of the peripheral devices that need to be hidden from the host processors and host operating system are given a particular binary value. In a presently preferred exemplary embodiment of the present invention, when the bridge 402B runs a configuration cycle to a peripheral device that is "masked" by the PCI_Device_ID_Mask register, the bridge 402B drives the corresponding IDSEL signal low (adaptable in a situation where the bridge 402B generates IDSEL signals, separate from the AD lines). Such a configuration cycle results in a condition known as "Master Abort" as though there were no device responding to that configuration access. Those skilled in the art may appreciate that this behavior is similar to what happens when system firmware or read-only memory (ROM) searches for non-existent PCI-compliant devices on a PCI bus. Moreover, as an obvious modification, the bridge 402B could be provided with the capability to not run any configuration cycles at all to the peripheral devices that may be rendered hidden.

It should be appreciated by those skilled in the art upon reference hereto that as a further variation of the present invention, when each peripheral device's IDSEL is tied to a specific, unique AD line, the masking apparatus only has to block the particular AD line from being asserted.

Figure 5A:
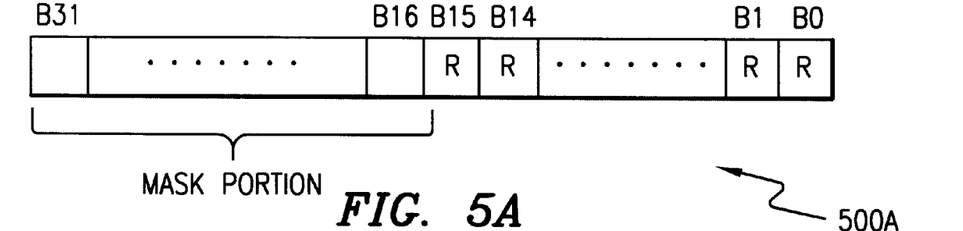
FIGS. 5A–5C illustrate exemplary embodiments of a mask register provided in accordance with the teachings of the present invention.
Figure 5B:
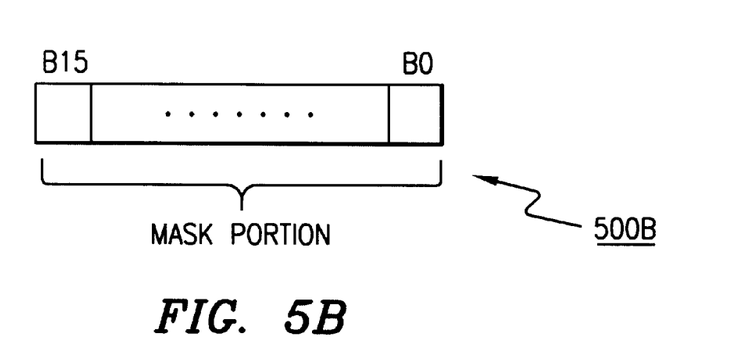
Figure 5C:
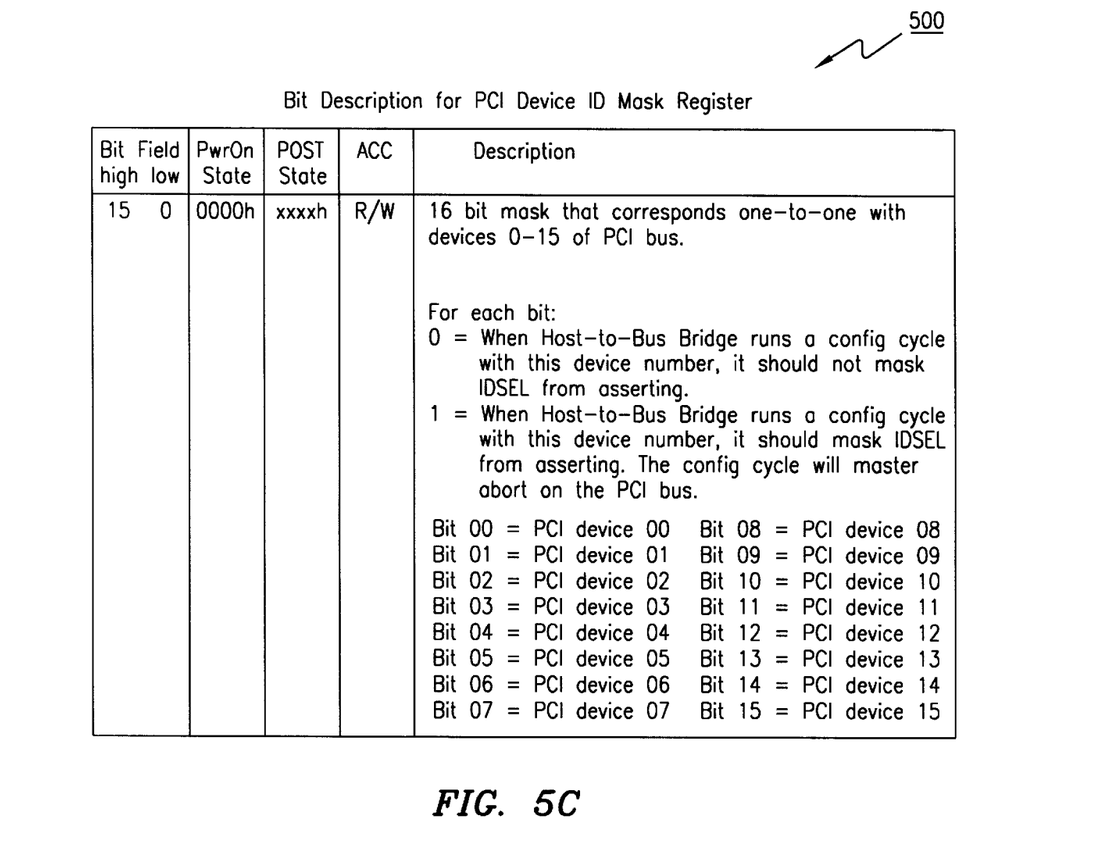

Referring now to FIGS. 5A through 5C, several embodiments of the PCI_Device_ID_Mask register are illustrated therein in accordance with the teachings of the present invention. The embodiment 600A depicts the PCI_Device_ID_Mask register as a four-byte register with the mask portion comprising bits b16 through b31. The least significant bits b0 through b15 may be marked as reserved for future use. The embodiment 600B depicts a 16-bit mask register portion without any reserved bits. The embodiment 600A may typically be implemented as an entry in the configuration space of a host-to-bus bridge (that is, a bridge as proximate as possible geographically to the host bus) so that any down-stream PCI-compliant peripheral device may be appropriately masked. In FIG. 5C, a table 600C illustrates bit description for an exemplary PCI_Device_ID_Mask register. As is known in the art, typical logic circuitry, for example, the OR-gate logic, the AND-gate logic or any suitable combination logic, may be employed for masking the externally-generated AD signals (connected to the appropriate IDSEL lines of the peripheral devices) based on the contents of the PCI_Device_ID_Mask register.

Figure 6:
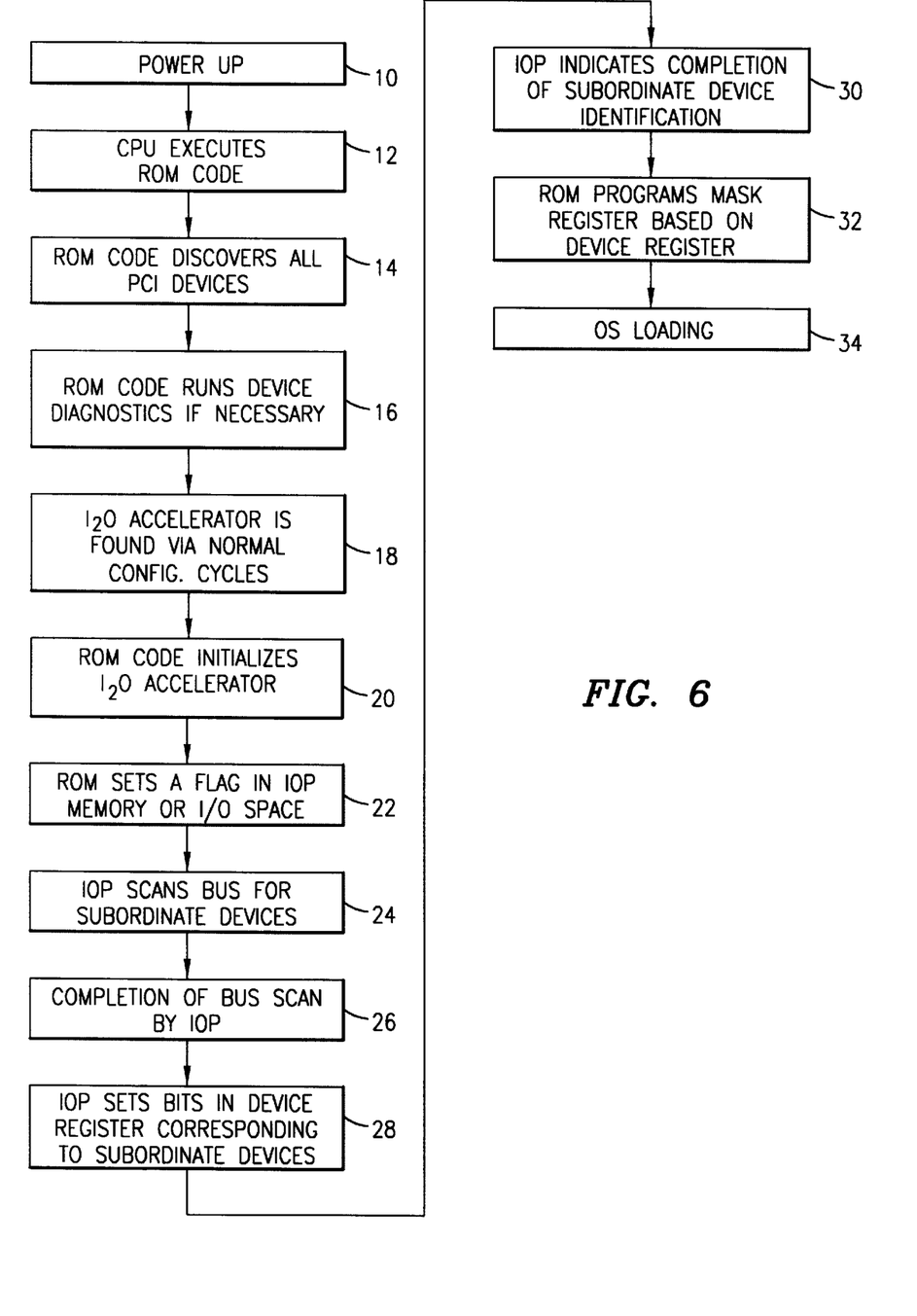
FIG. 6 depicts a flow chart of an exemplary embodiment of the methodology for hiding peripheral devices from a host processor and associated operating system in accordance with the teachings of the present invention.

FIG. 6 depicts a flow chart for an exemplary embodiment of the methodology for hiding peripheral devices in accordance with the teachings of the present invention so that an $I_2O$ accelerator would be able to properly control the I/O transactions associated with such hidden devices. Upon system power up (step 10), the host processor executes necessary system software (i.e., ROM code), as shown in step 12. At this point, the PCI_Device_ID_Mask register provided with the host-to-bus bridge of the system is not programmed with a desired mask configuration and the ROM code has access to the peripheral devices of the system. The ROM code, accordingly, discovers the devices via known methods (step 14) and runs appropriate device-dependent diagnostics, if necessary (step 16). At this point, an $I_2O$ accelerator, preferably with an IOP, is thus found by the ROM code via normal configuration cycles (step 18). The accelerator is then initialized by the ROM code (step 20). At the end of this initialization, in a 32-bit register (I2ODEV[31::0]) residing on the accelerator, the ROM code informs the accelerator of its device number identification. Those skilled in the art should realize upon reference hereto that this I2ODEV[31::0] register may also be implemented in the configuration space of the accelerator.

Upon the completion of the accelerator initialization, the ROM code sets a flag (I2ODEV[1]) as shown in step 22. This flag enables the IOP associated with the accelerator to scan the bus for its subordinate peripheral devices (step 24). Accordingly, it will be realized that in a presently preferred exemplary embodiment of the present invention, the IOP may not attempt to run configuration cycles to itself. Completion of the scanning of the bus (step 26) is preferably detected by the ROM code by checking another flag (I2ODEV[0]). The IOP, subsequently, sets every bit in the I2ODEV[31::16] register portion associated with a subordinate device (step 28) that is to be hidden. The IOP indicates the completion of subordinate device identification (step 30) by setting the I2ODEV[0] flag. The ROM code subsequently programs the PCI Device ID Mask register, which may be provided with an up-stream host-to-bus bridge or as a separate masking module, on the basis of the contents of the I2ODEV[31::16] register portion (step 32). The host operating system is then loaded in a known manner (step 34). Upon completing this initialization and setup procedure, no host processor (neither the ROM code nor the operating system) will "see" the peripheral devices subordinate to the $I_2O$ accelerator. The accelerator, in turn, is now responsible for initializing its subordinate devices.

Based upon the foregoing, it should be understood that the present invention provides an advantageous solution for hiding peripheral devices from host processors and host operating systems so that $I_2O$-compliant devices or devices otherwise subordinated to an IOP are not accessed by such host processors for I/O operations associated therewith. By implementing a mask register in accordance with the teachings of the present invention as hierarchically close as possible to the host bus, it is feasible to mask any of the down-stream peripheral devices even in situations where they are in front of a PCI—PCI bus bridge. When the devices are behind a bus-to-bus bridge, the entire subsystem comprising the bridge and the secondary-side devices may be rendered invisible to the host processors.

Furthermore, the present invention obviates the need for numerous additional components—which increase a computer system's cost and complexity—required in some of the current solutions involving quick switches, et cetera. Additionally, because the masking apparatus is provided as geographically proximate as possible to the host bus, the present invention eases the difficulty in determining when to allow configuration cycles to be propagated or masked. It can be readily appreciated that it is much easier at the host-to-bus bridge to determine of a host processor is the initiator of the configuration cycle.

Figure 7:
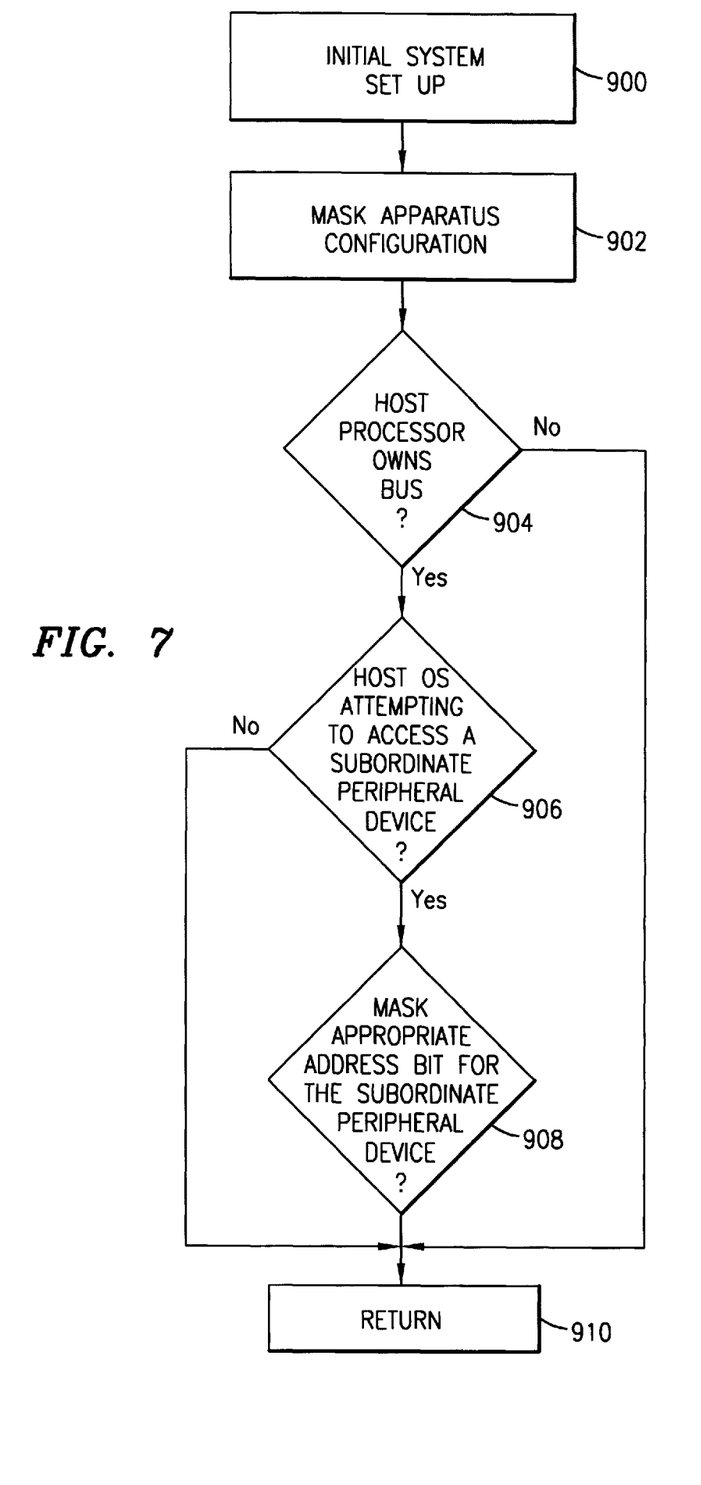
FIG. 7 depicts a flow chart of another exemplary embodiment of the methodology for hiding peripheral devices from a host processor and associated operating system in accordance with the teachings of the present invention.

Referring now to FIG. 7, depicted therein is a flow chart of another exemplary embodiment of the methodology for hiding peripheral devices. It should be appreciated that this embodiment is particularly adaptable with a computer system having a separate masking module, that is, a masking register is not provided with the host-to-bus bridge, rather, it is provided as another device on the bus. In this situation, the masking module apparatus is configured (step 902) after the initial system setup (step 900) in a similar manner as described above. The masking module apparatus is provided with logic circuitry to recognize whether a host processor is the owner of the bus and the host operating system is attempting to execute a configuration access to a subordinate peripheral device (steps 904 and 906). Based on this knowledge regarding host configuration cycles, the masking module apparatus masks the appropriate IDSEL signal or address bit for that subordinate peripheral device (step 908). Accordingly, the subordinate peripheral devices are hidden from host configuration accesses while the host processor owns the bus and attempts a configuration transaction involving such subordinate devices.

In one aspect of the present invention, one of the peripheral devices to be hidden from the host system may be hot-pluggable. If the IOP resource of the system has an appropriate hot-plug driver, then it receives the "hot plug interrupt" signal when the peripheral device is hot plugged. Preferably, it is the responsibility of the IOP to determine if it wants to and can control the newly added device. If the IOP can control the new device, it loads the appropriate driver and notifies the system's BIOS that it will control the specific hot-plugged device. The system ROM will then set the appropriate bit(s) in the masking apparatus. After the IOP has completed its scan for new devices, the host OS is notified of the hot-plug event(s). Preferably, the OS then performs its normal scan for new devices. If new devices are found (e.g., those that the IOP cannot or does not want to control), the appropriate host drivers are loaded.

It is also contemplated herein that the present invention embraces the situations where the IOP resource may itself be hot-pluggable such that it may be replaced, removed or added to the system. After the removal/replacement, the IOP preferably claims its devices (i.e., devices it can and wants to control) and notifies the system BIOS which devices it is controlling. The BIOS then updates the masking apparatus accordingly. In the event that the IOP has been removed and not yet replaced, the masking apparatus will allow all devices to be seen by the host processors. When notified (e.g., via an interrupt or a message), the host OS is then responsible for identifying the configuration change and load and/or unload the appropriate device drivers.

Although only certain embodiments of the apparatus of the present invention have been illustrated in the accompanying Drawings and described in the foregoing Detailed Description, it will be understood that the invention is not limited to the embodiments disclosed, but is capable of additional rearrangements, modifications and substitutions without departing from the spirit of the invention as set forth and defined by the following claims. For example, it should be realized that where the Bus Number Field parameter is known in multi-segment I/O bus systems, such parametric information may be incorporated into the masking apparatus of the present invention in addition to the actual device identification values, thereby realizing a "hierarchical masking protocol". Accordingly, even devices behind a bus-to-bus bridge may be individually masked from the host processors in such systems. Moreover, although in some of the exemplary embodiments described herein the bridge and mask apparatus are shown to be separate structural elements from the memory controller elements, one of ordinary skill in the art should realize that all these elements may also be integrated together in some computer systems. That is, for example, in the exemplary computer system 100 depicted in FIG. 1, the bridge/mask apparatus 202 may be integrated with the memory controller 104.

It should be understood, accordingly, that the scope of the present invention encompasses all such arrangements, variations and modifications as described hereinabove and is solely limited by the claims as follows.

What is claimed is:

1. A computer system having a host processor, a processor bus, and a host operating system executing on the host processor, the system comprising:

a first plurality of input/output (P/O) devices coupled to a first I/O bus;

a second plurality of I/O devices coupled to a second I/O bus;

an I/O bridge coupled between the first I/O bus and the second I/O bus; and a host bridge coupled between the processor bus and the first I/O bus, wherein the host bridge comprises a masking module configured to mask at least a portion of the second plurality of I/O devices from at least one of the host processor and the host operating system, but not from the first plurality of I/O devices.

2. The system as recited in claim 1, wherein the masking module comprises a mask register with a plurality of bit locations, the plurality of bit locations corresponding to the at least a portion of the second plurality of the I/O devices such that a binary value in a particular bit location masks the corresponding one of the at least a portion of the second plurality of I/O devices.

3. The system as recited in claim 2, wherein the register operates to block configuration cycles associated with the portion of the second plurality of I/O devices.

4. The system as recited in claim 2, wherein the register operates to block memory cycles associated with the portion of the second plurality of I/O devices.

5. The system as recited in claim 2, wherein the register operates to block input/output cycles associated with the portion of the second plurality of I/O devices.

6. The system as recited in claim 1, wherein the masking module is further configured to mask at least a portion of the first plurality of I/O devices from at least one of the host processor and the host operating system.

7. The system as recited in claim 1, wherein the first and second I/O buses comprise first and second Peripheral Component Interface buses.

8. A computer system, comprising:

a host processor coupled to a processor bus;

a first I/O bus;

a host bridge coupled between the processor bus and the first I/O bus;

a plurality of devices coupled to the first I/O bus, the plurality of devices including a first plurality of peripheral devices and an I/O processor, wherein the I/O processor is down-stream of the host bridge and configured to control at least a portion of the first plurality of the peripheral devices, and wherein the host bridge is configured to mask the portion of the first plurality of the peripheral devices from the host processor;

a second I/O bus operably coupled to the first I/O bus via a bus-to-bus bridge; and a second plurality of peripheral devices coupled to the second I/O bus, wherein the host bridge is configured to mask at least a portion of the second plurality of peripheral devices from the host processor.

9. The system as recited in claim 8, wherein the host bridge comprises a mask register with a plurality of bit locations, the plurality of bit locations corresponding to the at least a portion of the plurality of the peripheral devices such that a binary value in a particular bit location masks the corresponding one of the at least a portion of the plurality of peripheral devices.

10. The system as recited in claim 9, wherein the register operates to block configuration cycles associated with the portion of the plurality of peripheral devices.

11. The system as recited in claim 8, wherein the I/O processor and the I/O accelerator are integrated in a single device.

12. A computer system, comprising:

a host processor coupled to a processor bus;

a host bridge coupled between the processor bus and a first I/O bus;

a first plurality of I/O devices coupled to the first I/O bus;

a second plurality of I/O devices coupled to a second I/O bus;

a bus-to-bus bridge removably coupled between the first I/O bus and the second I/O bus, the bus-to-bus bridge comprising an I/O processor configured to control the second plurality of I/O devices; and a masking module configured to mask at least a portion of the first plurality of I/O devices from the host processor when the bus-to-bus bridge is not coupled, and wherein the masking module is reconfigurable to mask at least a portion of the first plurality of I/O devices and the second plurality of I/O devices from the host processor when the bus-to-bus bridge is coupled to the first I/O bus.

13. The system as recited in claim 12, wherein the masking module and the host bridge are integrated in a single device.

14. The system as recited in claim 12, wherein the masking module is located proximate the host bridge.

15. The system as recited in claim 12, wherein the I/O processor is hot-pluggable.

16. The system as recited in claim 12, wherein the masking module is upstream of the bus-to-bus bridge.

17. A computer system, comprising:

a host processor disposed on a processor bus;

a first I/O bus operably coupled to the processor bus via a host bridge;

a plurality of devices disposed on the first I/O bus down-stream of the host bridge, the devices including a first plurality of peripheral devices, an accelerator module, and a masking module;

a second I/O bus operably coupled-to the first I/O bus via a bus-to-bus bridge; and a second plurality of peripheral devices disposed on the second I/O bus, wherein the accelerator module is configured to control at least a portion of the first plurality of peripheral devices, wherein the masking module is configured to mask the portion of the first plurality of peripheral devices from the host processor, and wherein the masking module is configured to mask the second plurality of peripheral devices from the host processor but not from the first plurality of peripheral devices.

18. The system as recited in claim 17, wherein the masking module and the accelerator are integrated in a single device.

* * * * *